United States Patent [19]

Rohlfing

[11] Patent Number: 4,690,804
[45] Date of Patent: Sep. 1, 1987

[54] CATALYST FEED SYSTEM

[75] Inventor: Raymond G. Rohlfing, Bartlesville, Okla.

[73] Assignee: Phillips Petroleum Company, Bartlesville, Okla.

[21] Appl. No.: 777,145

[22] Filed: Sep. 18, 1985

Related U.S. Application Data

[60] Division of Ser. No. 514,387, Jul. 15, 1983, Pat. No. 4,563,665, which is a continuation of Ser. No. 282,312, Jul. 10, 1981, abandoned.

[51] Int. Cl.$^4$ ............................................... B01J 8/08
[52] U.S. Cl. ................................... 422/219; 422/225; 222/61; 222/241
[58] Field of Search ............................... 422/110–113, 422/144, 147, 215, 219, 222, 225, 232; 366/133, 184, 195; 222/61, 241; 414/326, 786; 406/61, 135

[56] References Cited

U.S. PATENT DOCUMENTS

| | | | |
|---|---|---|---|
| 1,559,666 | 11/1925 | Bernier | 222/241 |
| 2,385,189 | 9/1945 | Bowles | 422/219 |
| 2,670,278 | 2/1954 | King et al. | 422/111 |
| 3,167,398 | 1/1965 | Whittington | 422/131 |
| 3,485,535 | 12/1969 | Fabre | 406/61 |
| 3,595,437 | 7/1971 | Howard | 222/61 |
| 3,737,285 | 6/1973 | Hicks, Jr. | 422/111 |
| 4,162,894 | 7/1979 | Tribble | 422/111 |
| 4,164,244 | 8/1979 | Meir | 222/241 |
| 4,191,500 | 3/1980 | Oberg et al. | 406/146 |

Primary Examiner—David L. Lacey
Attorney, Agent, or Firm—A. W. Umphlett

[57] ABSTRACT

A catalyst mixing tank having an axially aligned cylindrical outlet conduit at the vessel bottom has an agitator on a shaft which terminates in a spiral configuration extending from the vessel and terminating within the outlet conduit thereby providing agitation within the outlet conduit. This catalyst mixing tank combined with a downstream ball-check feed valve with the feed valve having a diametrical clearance between ball and cylinder in a range of about 0.040 inch to the maximum clearance that precludes leaking between ball and cylinder and with control of the pressure differential across the ball-check feed valve provides a catalyst feed system particularly suitable for use with viscous material or material likely to bridge an opening.

4 Claims, 1 Drawing Figure

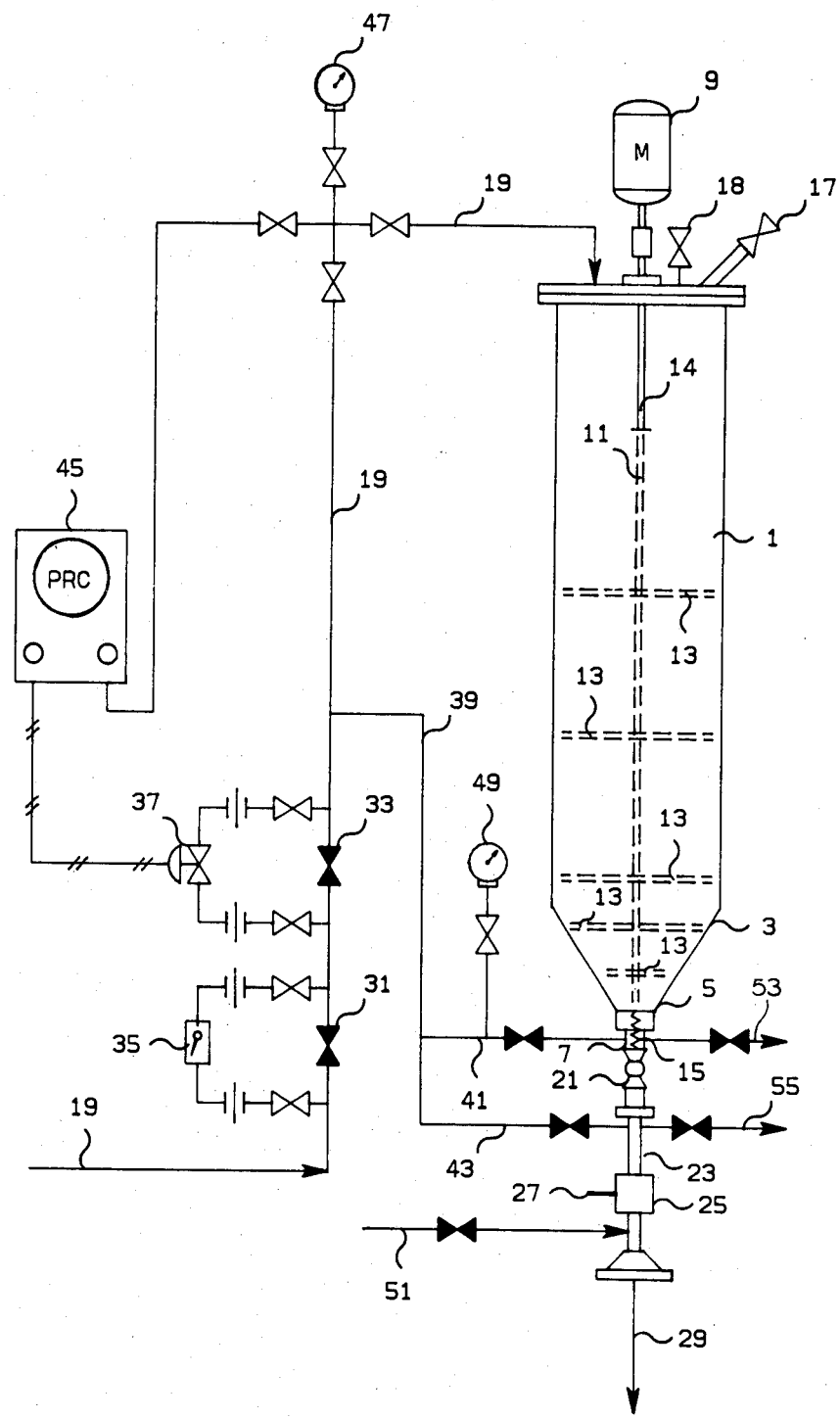

CATALYST FEED SYSTEM

This application is a Division of application Ser. No. 514,387, filed July 15, 1983, now U.S. Pat. No. 4,563,665 which is a continuation of application Ser. No. 282,312, filed July 10, 1981, now abandoned.

BACKGROUND OF THE INVENTION

This invention relates to catalytic reactions. In one of its aspects this invention relates to the introduction of catalyst into a reactor. In another of its aspects this invention relates to a method and apparatus for preparing catalyst mixtures and assuring free flow of the mixture in a controlled amount to the reactor. In another of its aspects this invention relates to the automatic transfer of catalyst mixture to a reactor with delivery of measured quantities without unscheduled stoppage of flow.

In many chemical reactions, particularly in the polymerization of certain hydrocarbon monomers, a catalyst is utilized to promote the chemical reaction. These reactions are sensitive to the quantity of catalysts utilized so that the production rate of the reaction can be controlled by controlling the rate of catalyst feed into the reaction. Any unwarranted stoppage of flow of the catalyst makes control of the reaction unpredictable and can produce serious harm to the quality of the product.

In many catalyst preparation operations a mixture of catalyst ingredients and carrier are apportioned into a catalyst feed tank, often called a mud tank, for thorough mixing before being passed in controlled amounts into the reaction vessel for contact with monomeric reactants. Some catalyst mixtures contain such a proportionally high amount of solid material that it is difficult to prevent settling of the solids in the bottom of the mixing tank. Other catalysts can be coated with polymer often called prepolymer, to provide some control in the particle size distribution of the polymer produced using the catalyst. Such catalyst mixtures often have a tendency to bridge narrow openings in a catalyst mixing vessel. Both of these problems are evident in catalyst mixing systems which use tanks as the mixing vessels, particularly when the flow from the bottom of the tank has been discontinued.

Accordingly, an apparatus has now been devised for improving the agitation near the outlet of a mixing tank which is adequate to provide free flow for catalyst or other mixtures which are viscous or tend to bridge narrow openings. This apparatus has been combined into a system principally for assuring a measured flow of catalyst into a reactor vessel but which is also of use for providing a measured flow of other hard-to-handle mixtures from a mixing vessel.

It is therefore an object of this invention to provide apparatus for assuring agitation of material at the bottom outlet of a tank. It is another object of this invention to provide an agitated catalyst mixing tank. It is another object of this invention to provide a ball check feed operable for transferring polymer coated catalyst. It is still another object of this invention to provide method and apparatus for assuring free flow of a measured amount of material, particularly catalyst, from a mixing vessel.

Other aspects, objects and the various advantages of this invention will become apparent upon reading this specification, studying the drawing, and reading the appended claims.

STATEMENT OF THE INVENTION

According to this invention an apparatus is provided which is a vertically aligned vessel having an axially aligned port at the vessel bottom with the port extended by cylindrical outlet conduit connected thereto and with an agitator shaft axially aligned within the vessel with the shaft having agitation means attached thereto and with the shaft terminating in a spiral configuration extending from the vessel bottom and terminating within the cylindrical outlet conduit.

In one of the embodiments of this invention the mixing tank described above is combined into a system for charging material, particularly catalyst, from the mixing tank in controlled amounts by providing downstream in the outlet conduit a ball-check feed valve having a diametrical clearance between the ball and cylinder of the feed valve that is sufficient substantially to reduce the tendency of the ball to seize within the cylinder while transferring mixtures from the tank.

In a further embodiment the continuous operation of the mixing tank is improved by providing means for controlling pressure differential across the ball-check feed valve.

The operation of the invention is best understood by being read in conjunction with the drawing which is a diagrammatic representation of the combination of apparatuses that make up this invention.

BRIEF DESCRIPTION OF THE DRAWINGS

The FIGURE shows a mixing and transfer system according to the invention.

Referring now to the drawing which will be described as it would be used in the preparation of a catalyst mixture which is to be transferred into a reactor. The mixing vessel 1 which is an elongated, cylindrical tank having a cone bottom 3 which is equipped with an outlet port 5 at the apex of the truncated cone to which is attached a cylindrical outlet conduit 7, is equipped with a motor 9 driven agitator shaft 11 to which are attached agitator means 13 preferably using a universal coupling 14 and which terminates in a spiral configuration 15 which extends into the outlet conduit 7 extending as close as practicable to the downstream end of the outlet conduit. It can be seen that the combination of the agitation means 13 and the spiral configuration 15 at the end of the shaft 11 provides a maximum of agitation both within the body of the mixing vessel 1 and within the outlet conduit 7.

In the mixing tank the agitation is controlled by varying the speed of the motor 9 of the agitator shaft 11. The mixed catalyst then can pass through stop valve 21, conduit 23 and ball-check feed valve 25 which, in operation, is driven by a motor (not shown) connected to shaft 27 to disperse a measured amount of catalyst through line 29 into a reactor (not shown).

The remaining parts of the operating system shown in the drawing describe the means by which the pressure differential across the feed valve is controlled. In operation, catalyst slurry is charged through line 17 into feed mixing tank 1 displacing a nitrogen atmosphere that had been supplied through line 18. The nitrogen is vented through line 18 as the catalyst is supplied. When the tank is about 50 percent filled, catalyst inlet is discontinued and diluent is supplied through line 19 to completely fill the tank displacing the remaining nitrogen through line 18. The tank is run liquid full with the diluent charge supplying pressure control. Valves 31 and 33 in diluent line 19 can be closed to require that the diluent pass through a rotameter system 35 and through control valve 37 before passing on through lines 19 into the top of mixing vessel 1 or through line 39 and 41 or 39 and 43 as flush and pressurizing liquid into the outlet conduit 7 or transfer conduit 23 on either side of stop valve 21. The pressure control valve 37 can be set by pressure recorder controller 45 to maintain a desired pressure on the system as indicated at pressure indicators 47 and 49. The flow of diluent into the system at any given time is indicated by the rotameter.

Recycled diluent line 51 provides catalyst flush through line 29 downstream of the ball-check feed valve 25. Valve lines 53 and 55 provide blowdown or sampling connections from the outlet conduit 7 and the transfer conduit 23, respectively.

Although, as stated before, the system for discharging from a mixing tank is useful for any viscous material, particulate material, or material that tends to bridge restricted openings, it is particularly useful with catalyst mixing systems. This system is among the most effective in handling highly active transition metal catalyst such as polymer-coated compositions comprising Ti-Mg-Al-Cl-Alkoxide and polymer-coated TiCl$_3$ catalysts.

The catalyst mixing tank or mud tank can be any typical tank made of materials sufficiently resistant to the material contained therein to be useful. The invention embraces tanks having disked or cone bottoms, among others. The outstanding feature of the mixing system is the spiral configuration of the end of the shaft which extends into the outlet conduit.

In actual operation of the mixing vessel, some practical limitations have appeared, for instance: using a cone-bottomed tank with a 1½ inch OD pipe nipple as the outlet conduit to which is attached a block valve with a short-flanged nipple for attachment of the ball-check feed valve, it has been found that about a 15 inch maximum distance is the practical limit between the flange of the ball-check feed valve and the bottom of the cone. The agitation action of the spiral end of the shaft works efficiently when the end of the shaft comes within one inch of the stop in the block valve immediately downstream.

It has also beem determined that for service using some catalyst mixture combinations, particularly those containing polymer-coated catalyst, the diametric clearance of ball-check feed valve between the ball and the cylinder must be increased from the clearance usually found in articles of commerce to range from about 0.040 inch to the maximum that prevents leakage between the ball and the cylinder. At present about 0.040 inch to about 0.100 inch is considered an acceptable diametric clearance for most catalyst mixtures with about 0.045 inch to about 0.075 inch the most preferred range.

With the increased diametric clearance used in the ball-check feed valve, control of the differential pressure across the feed valve becomes more important. Any system for controlling this differential pressure within a practical range of about 60 to 130 psig is contemplated by this invention. The system set out in the description of the drawing for controlling the pressure on the upstream side of the ball-check feed valve is only one of the systems that can be used, although at this time it is considered to be among the more practical.

EXAMPLE I

A mud pot having a diameter of 16 inches and a capacity of about 62 gallons was constructed and equipped as depicted in the FIGURE. Into the cone-shaped bottom was screwed a 1½ inch OD, 3 inch long pipe nipple with the other end of the nipple attached to a block (stop) valve about 5 inches long. A 1½ inch OD, 3 inch long nipple connected the bottom of the stop valve with the top flange of the ball-check feed valve. A ½ inch OD nipple connected the bottom of feed valve to a sight glass which in turn terminated in a receiving vessel. The agitator, as shown in the FIGURE, terminated in a spiral about 4 inches long which ended about ¼ inch above the ball of the stop valve and which moved freely in the conduit.

The mud pot was charged about ½ full with a n-hexane slurry of a Ti-Mg-Al-Cl-Alkoxide catalyst containing about 12 wt.% prepolymer based on the weight of the dry solid catalyst. The mud pot was then filled liquid full with isobutane, pressured to about 300 psig with isobutane and the agitator started at about 60 rpm. The mud pot was operated as in a polymerization run. The catalyst charge passed through the open stop valve, and into the feed valve and through that into the sight glass and receiver (maintained at approximately 200 psig). The feed valve, modified to a clearance of 0.045 inch between ball and cylinder, was rotated allowing about 1 dump per minute. It was observed through the sight glass over a 36 hour period of time that catalyst was evenly discharged without valve hangup.

EXAMPLE II

Another run was conducted using the conditions described in Example I except that a feed valve having a clearance of 0.020 inch between ball and cylinder was employed. It was found that catalyst was discharged erratically at best from the feed valve even when the agitator speed was increased to about 120 RPM.

EXAMPLE III

Another run was conducted as in Example II except that the agitator device was not employed. Liquid from the top of the mud pot was injected into the conduit above the top of the stop valve in an attempt to achieve at least partial circulation of liquid through the catalyst bed. It was found that catalyst emerged from the feed valve only through the center of the catalyst bed and thereafter no more catalyst was discharged.

EXAMPLE IV

Another run was conducted as in Example III except that a modified Lapp pump was in communication with the top of the contents of the mud pot. The pump was modified by removing the inlet and outlet check balls so that the diaphragm could be employed as a pulsating device. It was found that catalyst would not discharge uniformly from the feed valve even with 57 pulses per minute supplied by the pump.

EXAMPLE V

Using the catalyst and the mud pot as described in Example I and a feed valve having a clearance between ball and cylinder of 0.060 inch, polyethylene was produced in a loop reactor containing isobutane diluent for 72 hours without incident at the rate of about 13,000 lbs polymer per pound catalyst per hour. The recovered polyethylene had a melt index of 8 g/10 minutes (ASTM D1238, Condition E) and a density of 0.955 g/cc (ASTM D1505).

I claim:

1. An apparatus for charging polymer-coated catalyst compositions to a reactor comprising:
   (a) a catalyst mixing tank comprising:
      (i) a vertically aligned, elongated vessel having a bottom portion with an axially aligned port at the vessel bottom portion with an axially aligned, cylindrical outlet conduit attached to said port, and
      (ii) a agitator shaft axially aligned within said vessel, said shaft terminating in a spiral configuration, said spiral configuration extending through the port in the vessel bottom portion and at least a portion of said outlet conduit and terminating within said outlet conduit, said spiral configuration sized to move freely within said outlet conduit thereby providing agitation of material therein, and
   (b) a ball-check feed valve attached to a conduit extending from said outlet conduit of said mixing tank, said ball-check feed valve having a symmetrical clearance between ball and cylinder in a range of about 0.040 inch to about 0.100 inch.

2. An apparatus of claim 1 wherein the diametrical clearance between ball and cylinder of said ball-check feed valve is in a range of about 0.045 inch to about 0.075 inch.

3. An apparatus of claim 1 wherein a block valve is situated in said conduit extending from said outlet conduit, said block valve being located between said outlet conduit and said feed valve.

4. An apparatus of claim 1 having attached thereto means for controlling pressure differential across said feed valve.

* * * * *